(12) United States Patent
Danilak

(10) Patent No.: US 7,617,348 B2
(45) Date of Patent: *Nov. 10, 2009

(54) BUS INTERFACE CONTROLLER FOR COST-EFFECTIVE HIGH PERFORMANCE GRAPHICS SYSTEM WITH TWO OR MORE GRAPHICS PROCESSING UNITS

(75) Inventor: Radoslav Danilak, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/126,228

(22) Filed: May 23, 2008

(65) Prior Publication Data

US 2008/0222340 A1 Sep. 11, 2008

Related U.S. Application Data

(63) Continuation of application No. 11/454,992, filed on Jun. 15, 2006, now Pat. No. 7,412,554.

(51) Int. Cl.
*G06F 13/14* (2006.01)
(52) U.S. Cl. .................. 710/305; 710/306; 710/100
(58) Field of Classification Search ......... 710/305–306, 710/100, 240–244
See application file for complete search history.

(56) References Cited

U.S. PATENT DOCUMENTS

| | | | |
|---|---|---|---|
| 6,956,579 B1 | 10/2005 | Diard et al. | |
| 6,985,152 B2 | 1/2006 | Rubinstein et al. | |
| 7,007,025 B1 | 2/2006 | Nason et al. | |
| 7,099,969 B2 | 8/2006 | McAfee et al. | |
| 2004/0233230 A1 | 11/2004 | Hancock | |
| 2005/0088445 A1 | 4/2005 | Gonzalez et al. | |
| 2005/0140682 A1 | 6/2005 | Sumanaweera et al. | |
| 2006/0005000 A1 | 1/2006 | King et al. | 713/1 |
| 2006/0059451 A1 | 3/2006 | Koehler et al. | |
| 2006/0095593 A1 | 5/2006 | Kranich | |
| 2006/0098020 A1 | 5/2006 | Shen et al. | 345/520 |
| 2006/0294279 A1 | 12/2006 | McKee et al. | 710/301 |
| 2007/0139423 A1* | 6/2007 | Kong et al. | 345/502 |
| 2007/0214323 A1 | 9/2007 | Moll et al. | |

OTHER PUBLICATIONS

Danilak, Radoslav, entitled "Graphics Processing for Cost Effective High Performance Graphics System With Two or More Graphics Processing Units," U.S. Appl. No. 11/454,991, filed Jun. 15, 2006.
Danilak, Radoslav, entitled "Motherboard For Cost-Effective High Performance Graphics System With Two or More Graphics Processing Units." U.S. Appl. No. 11/455,072, filed June 15, 2006.
ATI CrossFire Technology White Paper, Jun. 14. 2005, 14 pages.

* cited by examiner

*Primary Examiner*—Mark Rinehart
*Assistant Examiner*—Kim T Huynh
(74) *Attorney, Agent, or Firm*—Cooley Godward Kronish LLP

(57) ABSTRACT

A bus interface controller manages a set of serial data lanes. The bus interface controller supports operating a subset of the serial data lanes as a private bus.

12 Claims, 13 Drawing Sheets

BUS INTERFACE CONTROLLER FOR COST-EFFECTIVE HIGH PERFORMANCE GRAPHICS SYSTEM WITH TWO OR MORE GRAPHICS PROCESSING UNITS

CROSS REFERENCE TO RELATED APPLICATION

This is a continuation application of U.S. application Ser. No. 11/454,992 filed Jun. 15, 2006 which application is hereby incorporated by reference in its entirety.

FIELD OF INVENTION

The present invention is generally related to graphics systems capable of supporting different numbers of graphics cards for improved performance. More particularly, the present invention is directed towards a private bus to support a cost-effective high performance graphics system.

BACKGROUND OF THE INVENTION

Graphics systems are typically implemented as a three-dimensional assembly of different cards (also sometimes called "boards") that are plugged into a motherboard. The motherboard is the main circuit board of the system and typically includes a central processing unit and other chips that are known as a "chipset." Additionally, a motherboard includes connectors, ports, and other features for attaching other electronic components.

Referring to FIG. 1, in a conventional graphics system a motherboard 100 includes a chipset that includes, for example, a bridge unit 110 and a central processing unit (CPU) 120. For the purposes of illustration, a graphics card 130 is illustrated in position for assembly. Graphics card 130 typically includes a graphics processing unit (GPU) (not shown). The graphics card 130 typically includes connector surfaces 135. For the purposes of illustration, a single connector surface 135 is illustrated that is designed to mate with a Peripheral Component Interface (PCI) Express (often referred to as "PCI-E" or "PCIe") connector 140. PCI-E is a high speed bus interface standard that utilizes high speed serial data lanes. The PCI-SIG organization publishes the PCI-E standard. An individual data lane 150 comprises two simplex connections, one for receiving data and the other for transmitting data.

The PCI-E standard specifies a protocol for bus interfaces to configure a set of data lanes into a link between two entities. The bandwidth of the link scales with the number of data lanes operated in parallel. The size of a PCI-E bus is commonly referred to as a multiple of one data lane, e.g., "×N" or "N×" to indicate that the link has N times the bandwidth of a single data lane. PCI-E supports bus sizes of ×1, ×2, ×4, ×8, ×16, and ×32 lanes. Conventionally, a variety of standard connector sizes are utilized, with a ×16 connector size being commonly used for graphics cards.

FIG. 2 illustrates a scalable link interface (SLI) graphics system similar to that developed by the Nvidia Corporation of Santa Clara, Calif. A SLI graphics system utilizes two or more graphics cards 130-A and 130-B operating together to produce a single output. That is, the graphics cards process graphics data in parallel. For example, two PCI-E ×16 connectors 140-A and 140-B may be provided on the motherboard 100, one for each graphics card 130-A and 130-B. A PCI-E ×16 bus (e.g., one ×16 bus from a chip 110) is split into two ×8 buses, with one ×8 bus going to each graphics card. Typically, a switch card 170 (also known as a "paddle card") is provided to determine which of the lanes of the ×16 bus from chip 110 are routed to the two PCI-E connectors 140-A and 140-B. The switch card 170 essentially amounts to an additional PCI-E connector which further includes a switching element. This switch card 170 typically has two positions, a first position in which all sixteen lanes from chip 110 are routed to one PCI-E connector (such as PCI-E connector 140-A) and a second switch position in which eight lanes are routed from chip 110 to PCI-E connector 140-A and the other eight lanes from chip 110 are routed to PCI-E connector 140-B. Thus, in an SLI mode each PCI-E connector has half of its serial data lanes coupled to a chipset, while the other half are unused. This results in an inherent compromise in that graphics processing power in increased (because of the two GPUs operating in parallel) but at the cost that each graphics card has half of the PCI-E bandwidth that would be the case if it was used alone.

SLI is typically implemented in a master/slave arrangement in which work is divided up between graphics processors. Software drivers distribute the work of processing graphics data between the two graphics cards. For example, in split frame rendering (SFR) the graphics processing is organized such that an individual frame is split into two different portions, which are processed by the different graphics processors in parallel. In alternate frame rendering (AFR), one graphics card processes the current frame while the other graphics card works on the next frame. In one version, an external SLI connector 180 provides a link between the graphics cards to transmit synchronization and pixel data between the graphics cards.

Recently, quad SLI systems that include four graphics cards have been released by the Nvidia Corporation. A quad SLI system is an extension of SLI in which four graphics cards process graphics data. For example, the work may be split into a combination of AFR and SFR in which groups of two graphics cards work on alternate frames, with each group of two graphics cards in turn performing split frame rendering.

One problem with conventional SLI is that it is more expensive than desired. In particular, extra components, such as switch cards and SLI connectors, are typically required, increasing the cost. Another issue is related to performance caused by splitting the PCI-E bandwidth of chip 110 between two graphics cards. The bandwidth from the chipset to the GPU is reduced by half compared to a single graphics card architecture. This also has the result of limiting the available bandwidth for GPU-to-GPU traffic that flows through the chipset.

As illustrated in FIG. 3, one alternative to conventional SLI would be to use a more expensive set of chips 305, 310 in the chipset to increase the PCI-E bandwidth such that each GPU 320-A and 320-B has a dedicated ×16 bandwidth to the chipset. However, in addition to the more expensive chipset that is required, the architecture illustrated in FIG. 3 does not have symmetric data paths 350 and 360 from the CPU 302 to the GPUs. Command streams from the GPU may thus arrive at each GPU at slightly different times. As a result, greater care must be taken in regards to synchronization of the operation of the GPUs 320-A and 320-B than for the case of symmetric data pathways. Alternatively, as illustrated in FIG. 4, a SLI architecture with a more expensive chipset of chips 402 and 404 might be used to increase the PCI-E bandwidth allocated to each GPU 420. For example, chips 404 with a ×32 PCI-E interface may be included to support each pair of GPUs 420 with a ×16 bus. However, for many market segments the increased performance of adding additional chips or more expensive chips does not justify the additional chip cost.

Therefore in light of the above-described problems the apparatus, system, and method of the present invention was developed.

SUMMARY OF THE INVENTION

A bus interface controller supports card-to-card communication. The bus interface controller manages a set of serial data lanes. The bus interface controller has a mode of operation in which a first subset of the serial data lanes is managed as one bus and a second subset of the serial data lanes is managed as a private bus.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
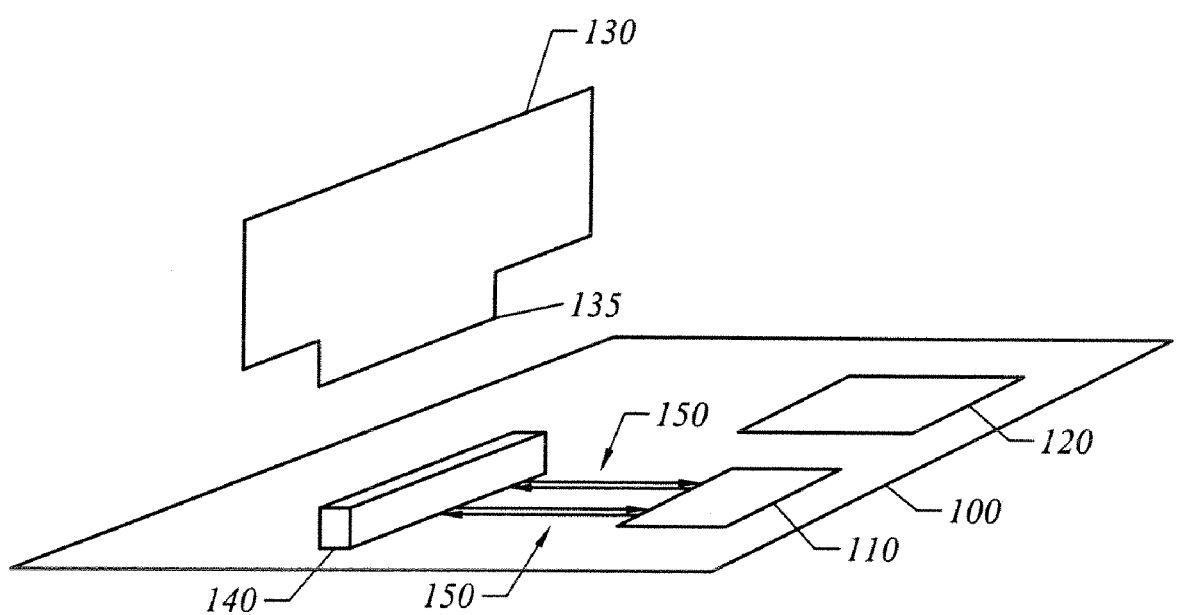
FIG. 1 illustrates a prior art motherboard of a graphics system with a conventional PCI-E bus.
Figure 2:
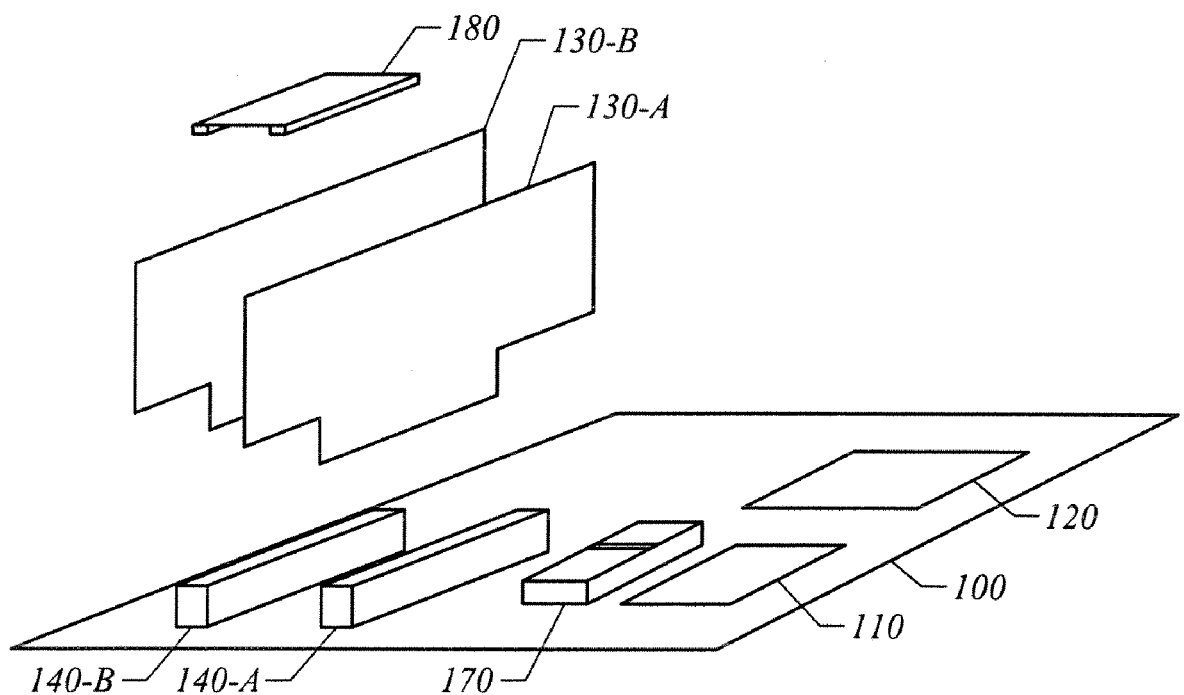
FIG. 2 illustrates a motherboard of a prior art scalable link interface graphics system having two graphics cards.
Figure 3:
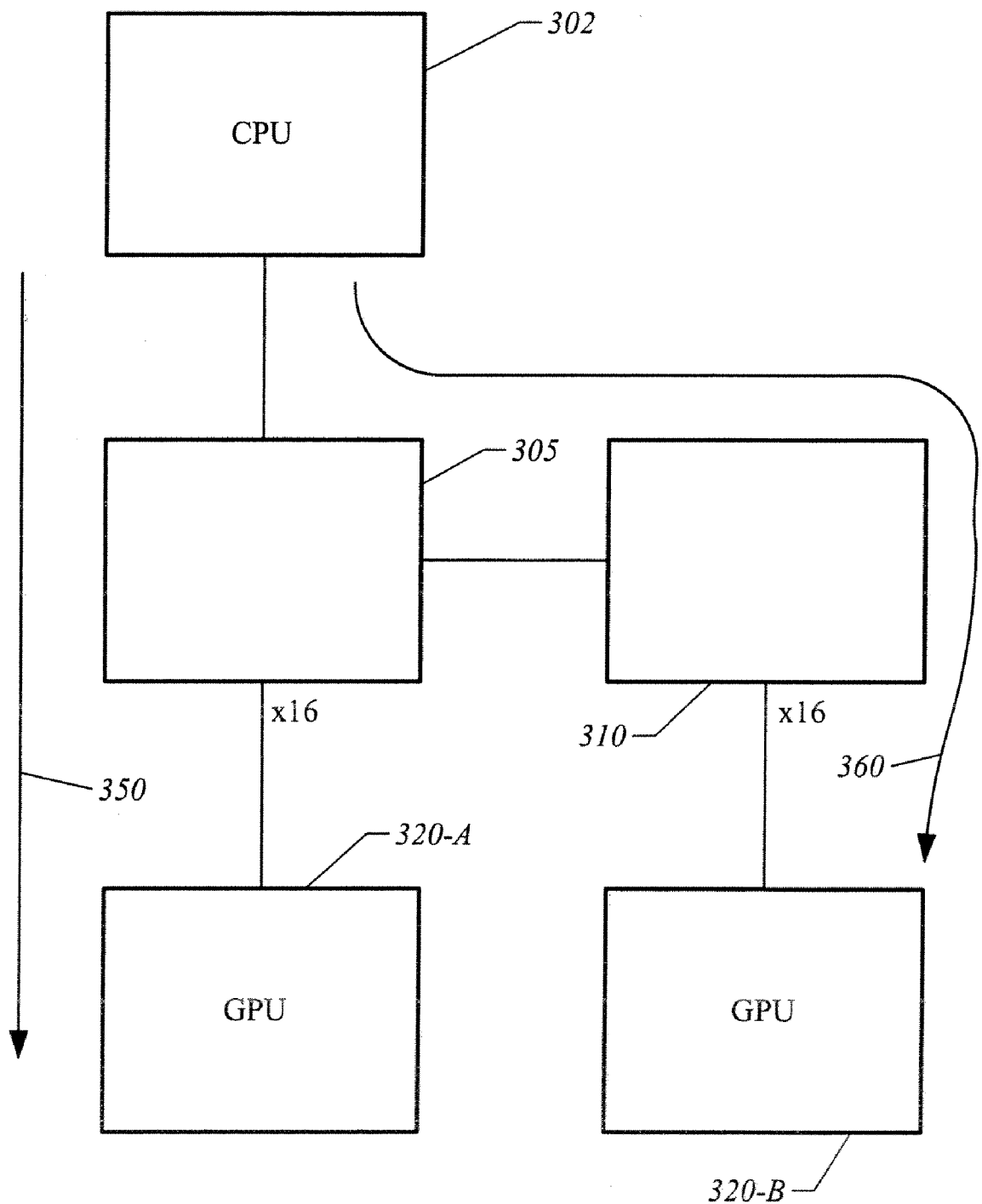
FIG. 3 is a block diagram of a prior art graphics system with two GPUs.
Figure 4:
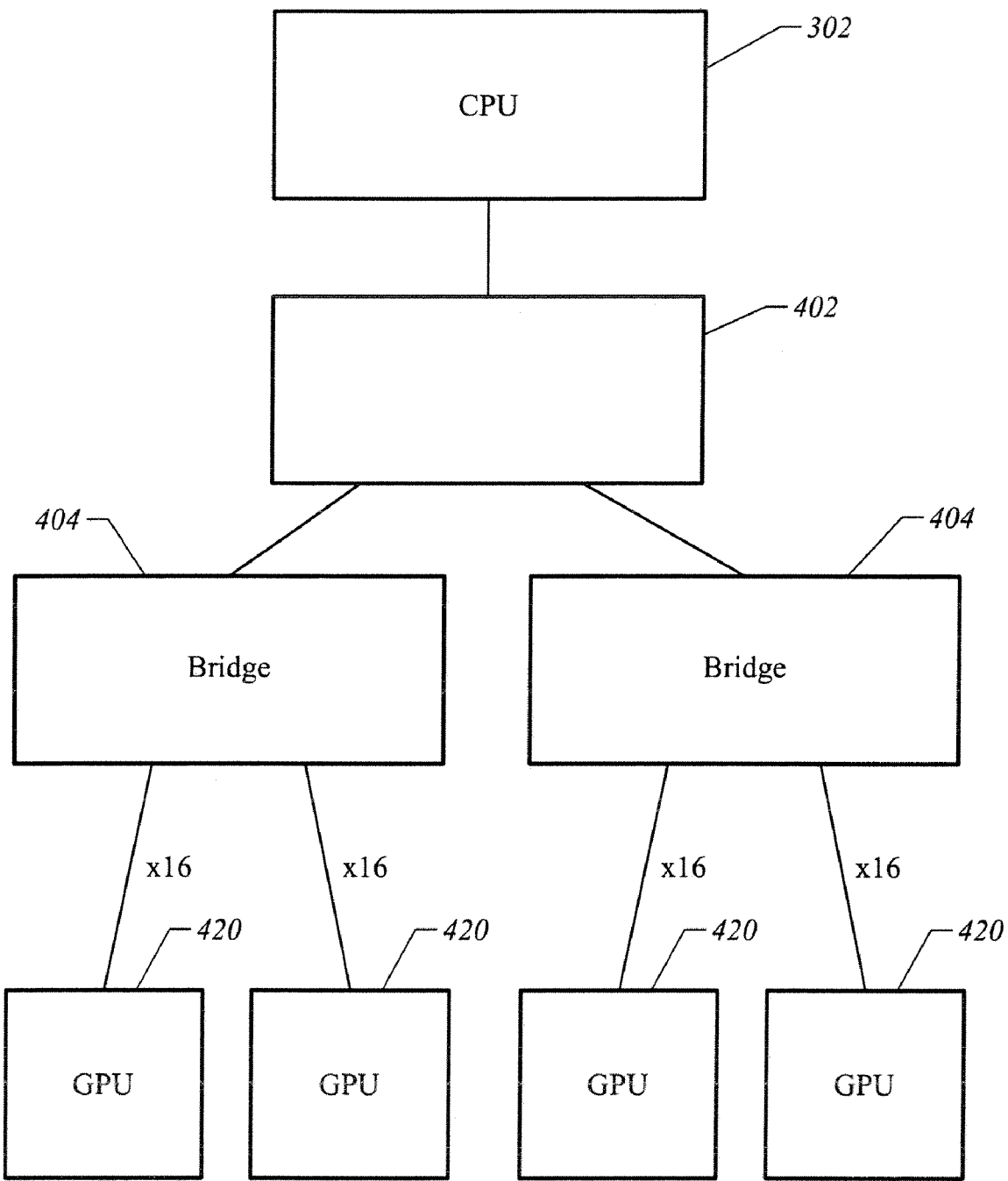
FIG. 4 is a block diagram of a prior art graphics system with four GPUs
Figure 5:
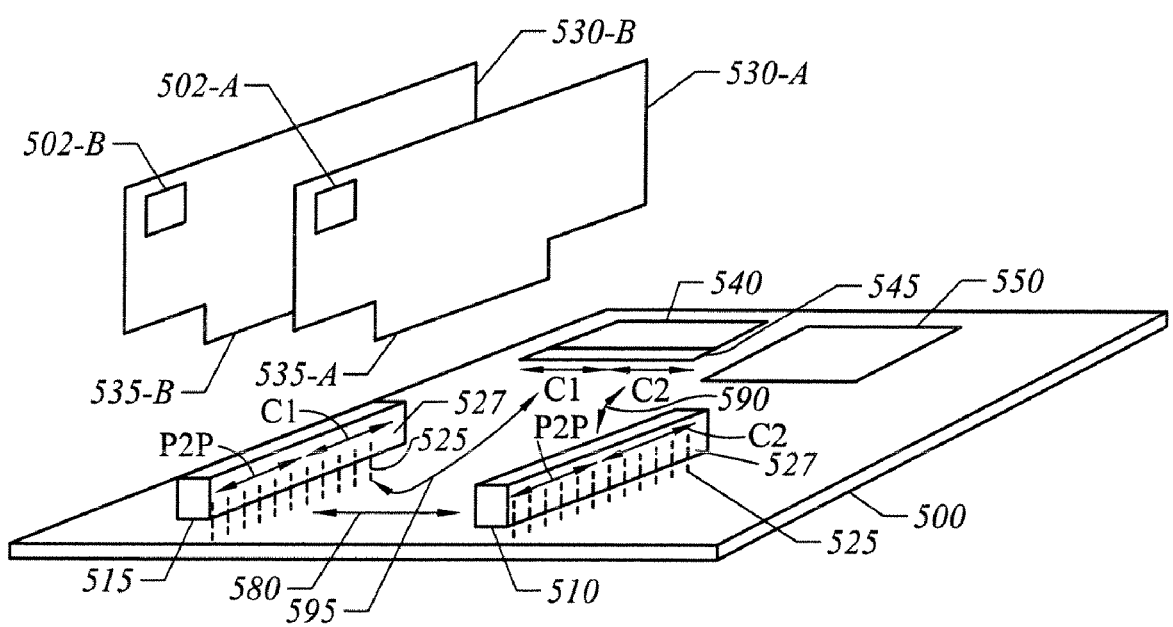
FIG. 5 illustrates a motherboard having PCI-E connectors coupled to form a private bus in accordance with one embodiment of the present invention.

FIG. 5 is a perspective view of one embodiment of the present invention with some conventional components omitted for clarity and other components not drawn to scale for purposes of illustration. A motherboard 500 includes a chipset which may include a CPU 550 and another chip 540 having a Peripheral Component Interface Express (PCI-E) interface 545. Motherboard 500 has two PCI-E connectors 510 and 515, such as two PCI-E ×16 connectors for receiving graphics cards 530-A and 530-B.

Graphics cards 530-A and 530-B have PCI-E connector surfaces 535-A and 535-B designed to mate with a corresponding PCI-E connector 510 or 515. Each graphics card 530-A and 530-B has its own respective graphics processing unit (GPU) 502-A and 502-B. Each graphics card 530-A and 530-B includes internal signal paths (not shown) to couple electrical signals from a PCI-E connector surface 535 to a respective GPU 502-A or 502-B.

An individual PCI-E connector, such as connector 510, has pins 525 and associated internal contact positions 527 of contact fingers, as illustrated in phantom. A PCI-E card-edge connector, such as connector 510 or 515, has contact fingers to accept a card and mate with the contact surfaces of connector surface 535. There are standard PCI-E connector pinouts corresponding to contact positions of contact fingers within the connector. The pinout (and its associated relationship to contact positions) are used to define particular serial data lanes. Thus, for example, a ×16 PCI-E connector has a pinout defining sixteen individual simplex receivers and sixteen individual simplex transmitters for the sixteen serial data lanes. The pinout also specifies an assignment of pins (and associated contact positions) to particular data lanes.

In one embodiment, the pins 525 (and their associated contact positions 527) of each connector 510 and 515 are further assigned a to either a PCI-E bus (e.g., a PCI-E bus 590 or 595 to chip 540) or to a private bus 580 such as a private bus between graphics cards 530-A and 530-B. PCI-E pinouts are organized with contact positions of transmitters and receivers arranged on two sides of the connector with ascending lane numbers arranged in a sequence along the connector. Thus, specific data lanes are assigned by making electrical connections to specific connector pins (which in turn are coupled to specific internal contact positions defined by the pinout). The P2P arrows illustrate a subset of data lanes assigned to a private bus 580 between connectors 510 and 515. The C1 arrow illustrates a subset of data lanes of connector 515 assigned to a PCI-E bus 595. The C2 arrow illustrates a subset of data lanes of connector 510 assigned to a PCI-E bus 590.

As indicated by the arrows on PCI-E interface 545 of chip 540, in one embodiment the bandwidth of the PCI-E interface of chip 540 is split into two sub-buses coupled to C1 and C2 data lanes. As one example, chip 540 may by part of a chipset based on the nForce4® chipset design of the Nvidia Corporation of Santa Clara, Calif. The nForce4® chipset permits a chipset PCI-E interface 545 to have its serial data lanes configured as either one ×16 PCI-E bus or as two ×8 PCI-E buses.

A private bus 580 connecting the P2P serial data lanes of connectors 510 and 515 provides a high data rate card-to-card bus. Investigations by the inventor indicate that GPU-to-GPU traffic constitutes a large fraction of the traffic in a SLI mode. Thus, a private bus formed between the P2P serial data lanes of two graphics cards may be used to improve performance. In one embodiment the PCI-E interface 545 of the chipset is a ×16 PCI-E interface and each connector 510 and 515 is a PCI-E ×16 connectors that has its serial data lanes assigned such that eight serial data lanes are allocated towards P2P and the eight other serial data lanes are allocated for communication with a chipset (i.e., as either C1 or C2 data lanes). However, it will be understood that these numbers are exemplary and that the more general case is that the private bus includes at least one serial data lane.

A private bus 580 between graphics cards 530-A and 530-B formed from P2P serial data lanes should be electrically compatible with PCI-E but may use PCI-E protocols or other protocols, such as a proprietary protocol. Illustrative examples of traffic carried by the private bus include synchronization data, pixel data, and message data. Other examples include cross-blit traffic for texture filtering. Additionally, since the private bus may be used to send specialized traffic between graphics cards, the data compression techniques may be chosen based on the type of data that is sent over the private bus.

Figure 6:
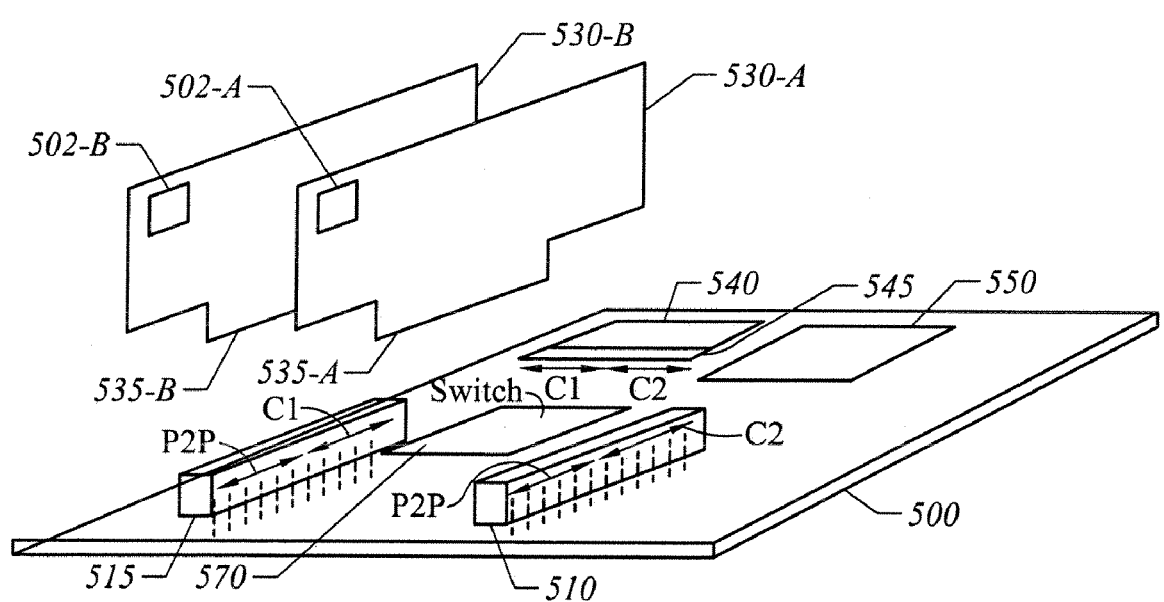
FIG. 6 illustrates a motherboard having PCI-E connectors coupled to form a private bus and which includes a switch card in accordance with one embodiment of the present invention.

Referring to FIG. 6, in one embodiment a switch card 570 may be included to route some or all of the signals between connector pins of connectors 510 and 515. In this embodiment, the corresponding PCI-E pins of chip 540 are also wired to switch card 570. Switch card 570 then performs a routing function to help form buses 580, 590, and 595 for an SLI-mode. However, a switch card 570 adds an additional expense. Thus, the embodiment of FIG. 6 may have a cost that is higher than desired for many applications.

Figure 7:
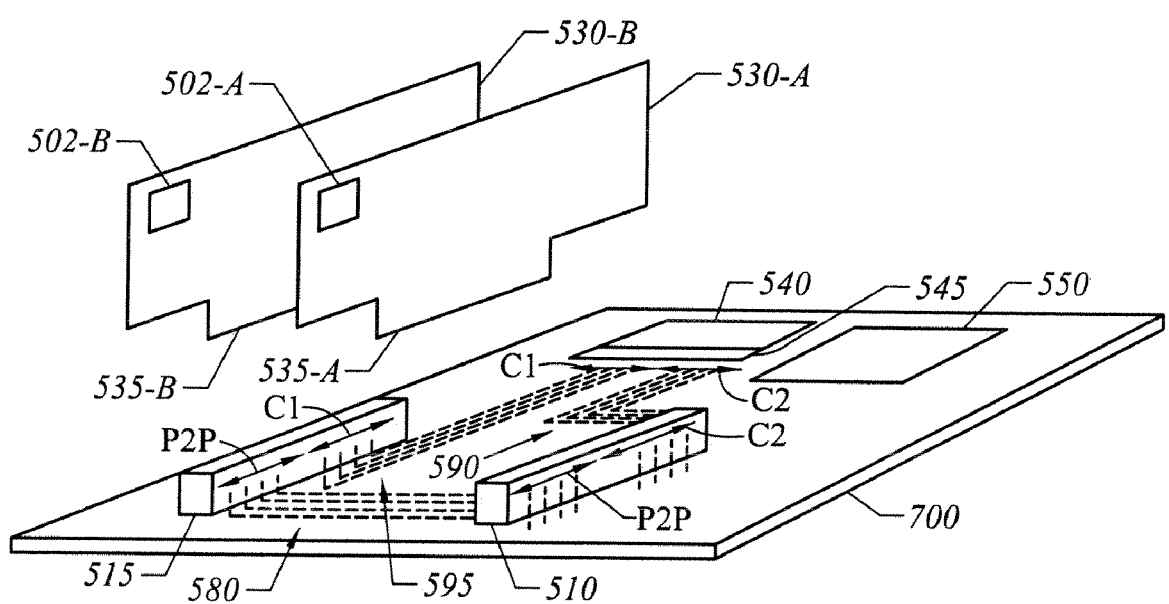
FIG. 7 illustrates a motherboard having PCI-E connectors coupled by connections formed on the motherboard to define a private bus in accordance with one embodiment of the present invention.

FIG. 7 illustrates an embodiment including a custom motherboard 700. Custom motherboard 700 includes electrical interconnections (illustrated in phantom) for private bus 580 to electrically couple P2P pins (not shown) of connectors 510 and 515. Custom motherboard 700 also includes electrical interconnections (illustrated in phantom) to electrically couple corresponding pins (not shown) of connectors 510 and 515 with pins (not shown) of chip 540 to form buses 590 and 595. Techniques to pattern electrical interconnections onto a motherboard are well known in the electronics packaging art. However, the electrical interconnections used to form buses 580, 590, and 595 are preferably fabricated to be compatible with the high data rates of PCI-E. The electrical interconnections formed in the motherboard for each bus 580, 590, and 595 may, for example, include hard-wired high speed simplex connections patterned onto motherboard 700 in a manner compatible with the low-voltage differential signaling used in PCI-E. Thus, for example, if a sub-bus, such as private bus 580, has eight serial data lanes the motherboard may have high-speed interconnections to support eight dual simplex connections of the eight serial data lanes. The embodiment of FIG. 7 thus requires a custom motherboard but eliminates the cost of a switching card.

Figure 8:
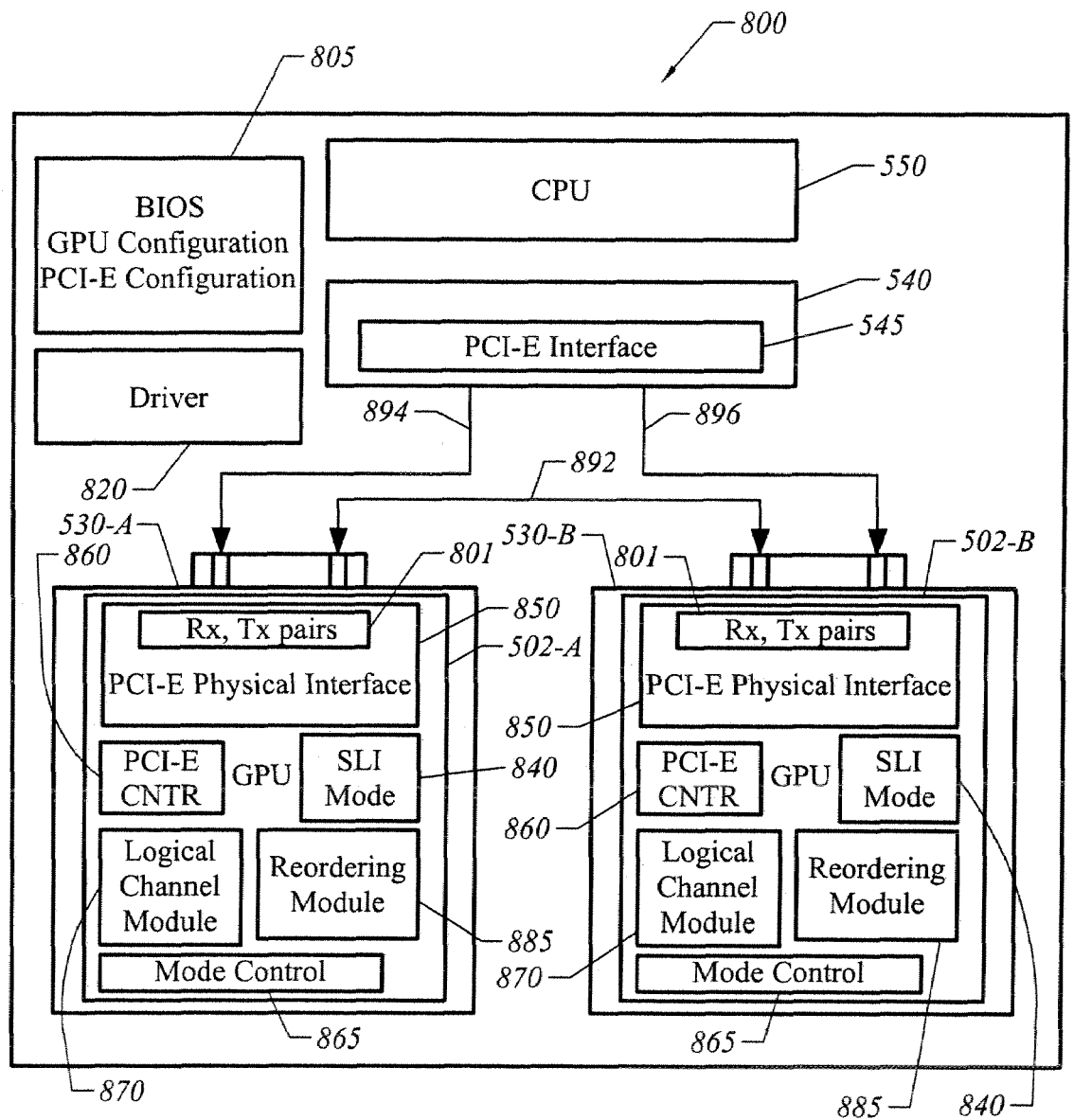
FIG. 8 is a functional block diagram of a graphics system in accordance with one embodiment of the present invention.

FIG. 8 is a block diagram illustrating in more detail functional components of the graphics system 800. The system includes software that runs on CPU 550, such as a BIOS 805 and a driver 820. An individual GPU, such as GPU 502-A, is preferably designed to have a default mode in which it acts as the sole GPU in some applications but is also configurable for use with other graphics cards for multi-graphics card SLI architectures. A configuration process is used to configure two GPUs 502-A and 502-B for SLI. In an SLI mode, driver 820 generates commands for both GPUs 502-A and 502-B to render different portions of frames (e.g. SFR). Each GPU 502-A and 502-B may also have SLI mode information 840 configured during a setup process.

In one embodiment, a PCI-E mode of each GPU 502-A and 502-B is also configured during a setup operation. Each GPU 502 includes a PCI-E physical interface 850 that includes transmitter and receiver pairs 801 to support serial data lanes, a PCI-E controller 860, a bus mode control module 865, and a logical channel module 870. In the PCI Express specification each point-to-point link between components may have 1, 2, 4, 8, 12, 16, or 32 dual simplex 2.5 Gbps lanes. PCI Express calls for 8 bit/10 bit data encoding to create a 2 differential pair, 2.5 Gbps (2.0 Gbps effective rate) dual simplex data stream with an embedded clock for each data lane. The PCI Express specification has a default that specifies that the link width is negotiated to the maximum link width supported by both sides of the bus. A link state machine executes the states of a link training and status state machine (LTSSM) specified by the PCI Express specification.

In the embodiment of FIG. 8, each rendering mode also has an associated bus interface mode, depending on the number of graphics cards used to render the frame and the manner in which the rendering of frame data is allocated to different graphics cards. Mode control module 865 may for example, be configured by a register write in a BIOS configuration step. Logical channel module 870 logically partitions the available serial data lanes into one or two channels, depending upon the operating mode. The logical channel module 870 has a first mode in which all of the serial data lanes of the physical interface 850 are considered to be part of a conventional PCI-E bus. The logical channel module has a second mode of operation in which the serial data lanes of the PCI-E physical interface 850 are logically partitioned into a first bus channel including a first subset of serial data lanes and a second bus channel having a second subset of serial data lanes. Thus, the two different supported modes permit a graphics card to be used either as a single card (with all serial data lanes used as one PCI-E bus) or for SLI with a subset of the serial data lanes used as a private GPU-to-GPU bus. Note that the functionality of mode control module 865 and logical channel module 870 may be integrated into PCI-E controller 860.

The logical partitioning of the physical interface 850 may utilize the same bus protocol (e.g., PCI-E) or different protocols. For example, one of the channels may use PCI-E and the other may use a proprietary protocol. Each channel may, for example, have its own state machine for configuring a link using the protocol selected for the channel.

It is desirable that graphics system 800 account for differences in data latency along different data pathways when SLI is used. Note that graphics system 800 has several different data pathways. These include a private bus 892 and also buses 894 and 896 between individual GPUs and chip 540. Thus, depending upon implementation details, some GPU-to-GPU traffic may be sent directly on private bus 892 whereas other GPU-to-GPU traffic may be sent via buses 894 and 896 through chip 540. Additionally, depending upon implementation details, other types of traffic may also take different routes, depending upon whether private bus 892 is used.

Some types of traffic in graphics system 800 may have a semantic order. That is, certain types of data traffic may require a critical order of the traffic be maintained (with respect to other events and/or traffic) in order for the data to be properly interpreted. As previously described, in a SLI architecture CPU 550 issues command streams to the GPUs 502-A and 502-B to divide work between GPUs 502-A and 502-B. Additionally, for certain types of graphics operations, one GPU 502-A may have to transfer data to another GPU 502-B for additional processing. As result, some types of traffic may require maintaining a semantic order. In some circumstances, there is a possibility that some types of traffic received by one GPU 502 over private bus 892 may arrive in an order slightly different than an ideal semantic order due to the differences in propagation time of the different data paths when SLI is used. A reordering module 885 is preferably provided to provide any necessary reordering to ensure proper semantic ordering of traffic regardless of the pathway that the traffic takes. For example, reordering module 885 may include a first-in, first-out (FIFO) buffer and reorder logic to reorder traffic into a proper semantic order. Alternatively, in one embodiment, each GPU 502-A and 502-B is configured to direct traffic in a manner selected to avoid sending traffic over private bus 892 that is critically dependent on semantic order.

As previously described, one benefit of the present invention is that the private bus may be used for GPU-to-GPU communication. Investigations by the inventor indicate that there is substantial GPU-to-GPU traffic in typical SLI architecture. In a conventional low-cost implementation of SLI this GPU-to-GPU traffic is typically routed through the chipset. In contrast, one embodiment of the present invention utilizes serial data lanes which would conventionally be unused to form the private bus. For SLI systems in which there is a substantial amount of GPU-to-GPU traffic, the private bus allows a low-cost solution to achieve performance comparable to more expensive solutions. Additionally, as previously described, in one embodiment the private bus is implemented in a fashion that eliminates the need for a switch card 170 and external SLI connector 180, resulting in potential cost savings.

Figure 9:
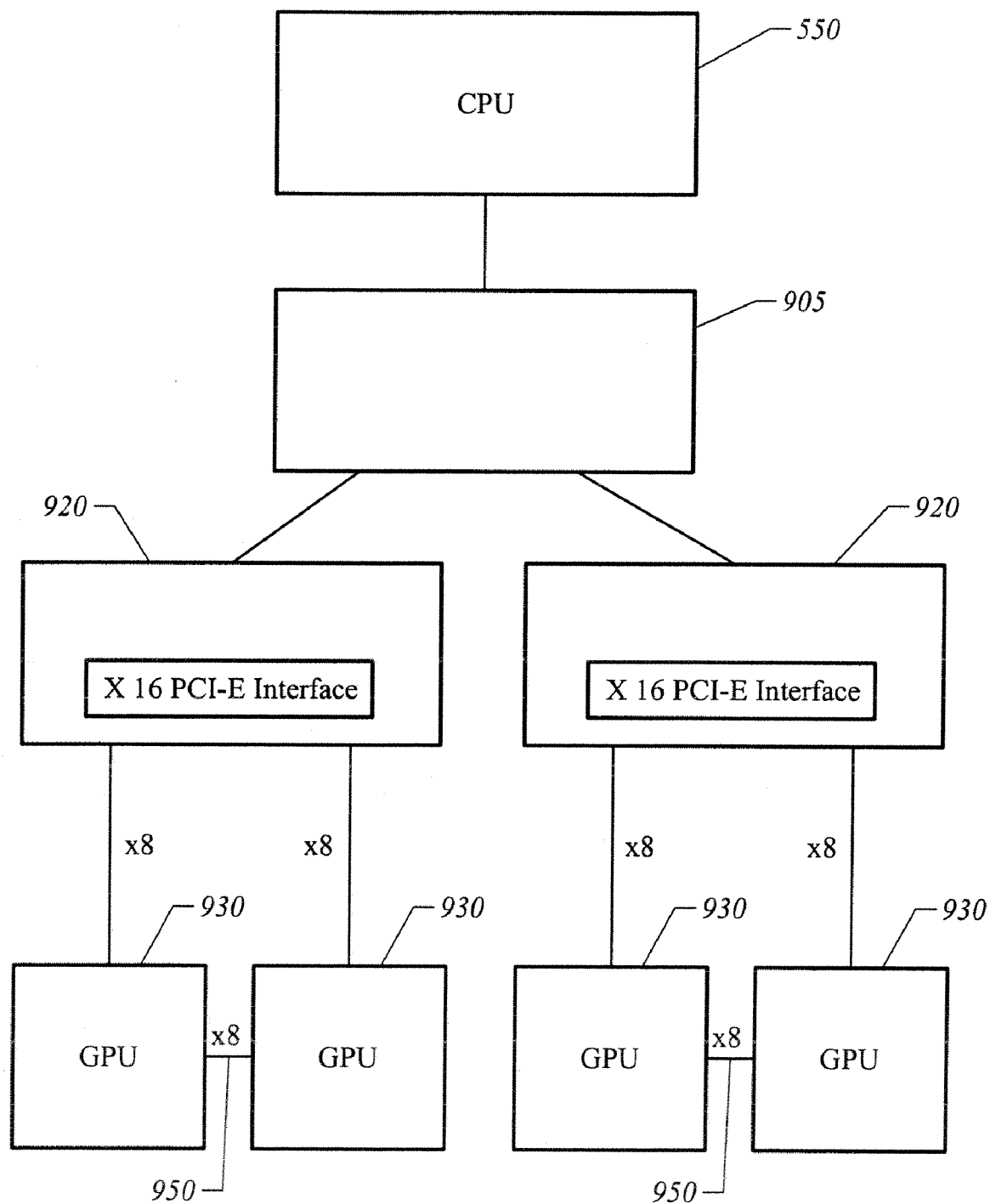
FIG. 9 is a block diagram of a quad SLI system in accordance with one embodiment of the present invention.
Figure 10:
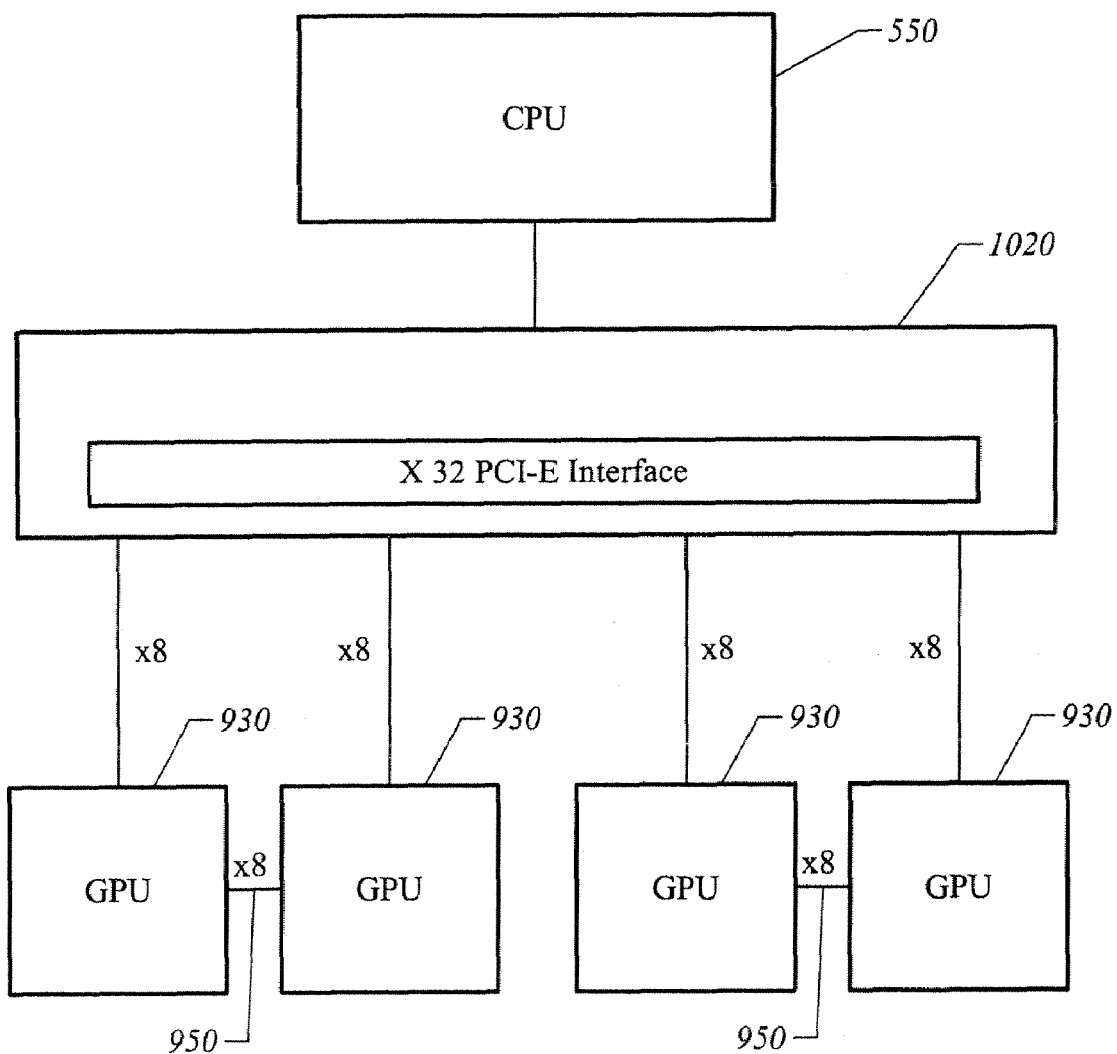
FIG. 10 is a block diagram of a second embodiment of a quad SLI system in accordance with one embodiment of the present invention.

It is contemplated that the present invention may be utilized in a variety of different SLI architectures. It will be understood that embodiments of the present invention also include quad SLI systems having four GPUs. As illustrated in FIGS. 9 and 10, for a high performance quad SLI system a more complicated chipset may be used to support four GPUs, with pairs of two GPUs having a private bus as previously described. For example, in the block diagram of FIG. 9, the chipset has a CPU 550, intermediate chip 905, and fans out to two chips 920, each with a ×16 PCI-E interface. Four GPUs 930 are supported, with the system supporting a ×8 private bus 950 between each pair of GPUs. FIG. 10 illustrates an architecture in which a chip 1020 has a ×32 PCI-E interface, such that it can support four GPUs 930 with ×8 PCI-E buses.

Figure 11:
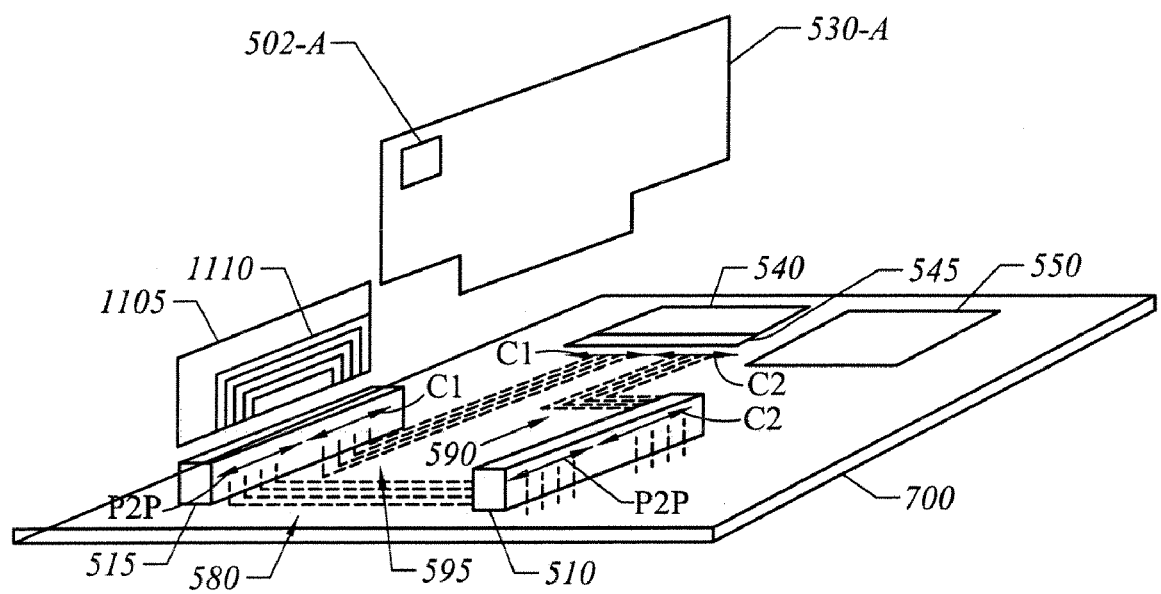
FIG. 11 illustrates an alternate implementation of the system of FIG. 7 in which a single graphics card is used.

In some applications it is desirable to provide options for configuring a graphics system with different numbers of graphics cards while making the best use of the available PCI-E bandwidth to the chipset. For example, referring again to the graphics system of FIG. 7, two graphics cards 530-A and 530-B are illustrated. However, it may be desirable to provide the option to utilize custom motherboard 700 in a configuration in which only a single graphics card 530-A is utilized with the full PCI-E bus bandwidth of PCI-E interface 545 available to graphics card 530-A. FIG. 11 illustrates custom motherboard 700 with only a single graphics card 530-A. In the example of FIG. 11, a printed circuit board (PCB) 1105 is installed in connector 515. PCB 1110 includes a bridge section 1110 having interconnects to bridge C1 data lanes with respective P2P data lanes. As a consequence, both C1 and C2 data lanes are available to support traffic between chip 540 and graphics card 530-A such that graphics card 530-A can utilize the full bandwidth of the PCI-E bus.

Figure 12:
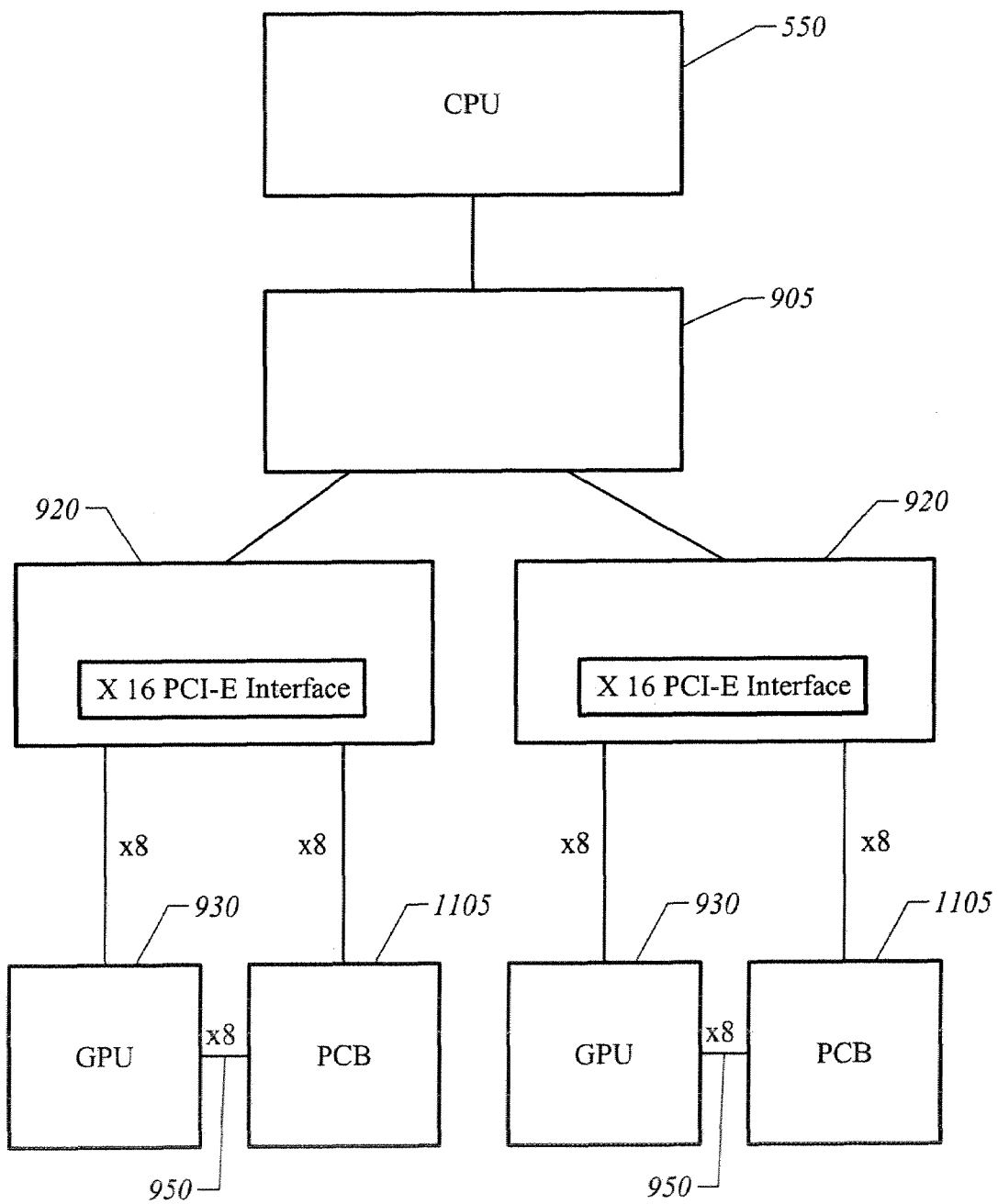
FIG. 12 illustrates an alternate implementation of the system of FIG. 9 in which two graphics cards are utilized.
Figure 13:
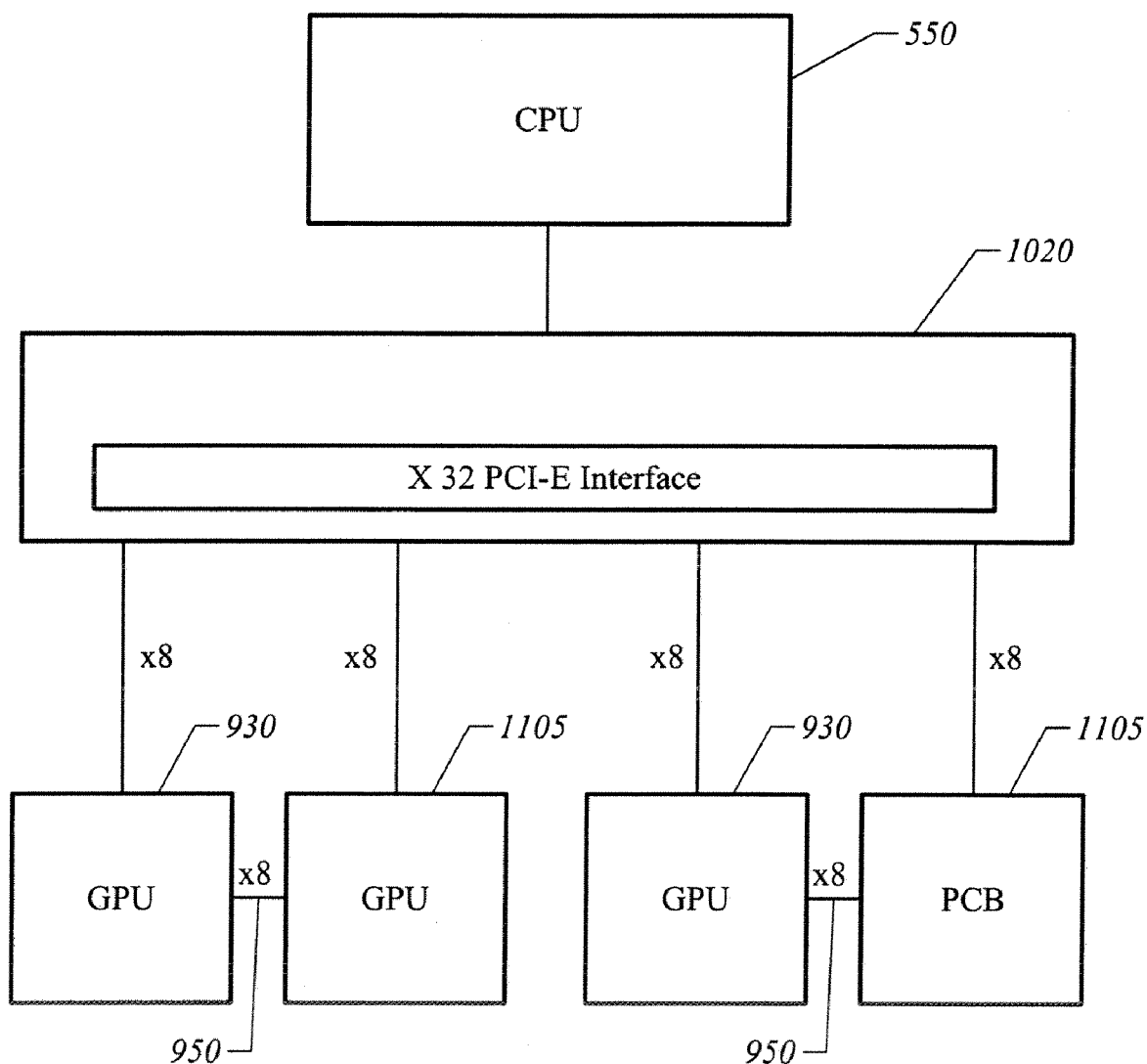
FIG. 13 illustrates an alternate implementation of the system of FIG. 10 in which two graphics cards are utilized.

In one embodiment, a graphics system supports SLI operation with different numbers of graphics cards, such as SLI operation with either two graphics cards or four graphics cards. FIG. 12 illustrates an implementation of the system of FIG. 9 in which one of the GPUs 930 in each pair is replaced with a PCB 1105. As a result, each individual GPU 930 in the implementation of FIG. 12 has the full PCI-E ×16 bandwidth. Thus comparing FIGS. 9 and 12, the same system can be used to support either two graphics cards (FIG. 12) or four graphics cards (FIG. 9). Similarly, as illustrated in FIG. 13, the system of FIG. 10 may also be implemented with one of the GPUs 930 in each pair replaced with a PCB 1105.

While PCI-E is a commonly used bus in the graphics industry, it will be understood that the present invention may be applied to other types of buses in which a set of serial data lanes may be logically partitioned. In addition, it will be understood that the present invention may be applied to private buses between entities other than graphics cards, such as a private bus providing a card-to-card link for other types of cards besides graphics cards.

While examples have been described with a GPU, more generally it will be understood that the present invention may also be applied to General Purpose GPUs (GPGPUs).

An embodiment of the present invention relates to a compute-storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus to provide card-to-card communication in a computing system, comprising:
    a bus interface controller to manage a set of serial data lanes; and
    said bus interface controller having a first mode of operation in which said set of serial data lanes is managed as a full bus and a second mode of operation in which a first subset of said serial data lanes is managed as a first bus and a second subset of said serial data lanes is managed as a second bus;
    the first bus coupling a first graphics processing unit (GPU) to a second GPU via a first data pathway including an intervening chipset with the second bus serving as a private bus providing a second data pathway that is a direct data pathway between the first and second GPUs;
    wherein in said second mode of operation said bus interface controller accounts for differences in data latency between said first data pathway and said second data pathway by performing data reordering for data requiring a semantic order.

2. The apparatus of claim 1, wherein in said first mode of operation said set of serial data lanes is operated as a Peripheral Component Interface Express (PCI-E) bus.

3. The apparatus of claim 1, wherein for said second mode of operation said bus interface controller logically partitions said set of serial data lanes into two channels.

4. The apparatus of claim 1, wherein there are sixteen serial data lanes, said first mode corresponds to a ×16 PCI-E bus having sixteen serial data lanes and said second mode corresponds to a first bus having eight serial data lanes and a second bus having eight serial data lanes.

5. An apparatus to provide card-to-card communication in a computing system, comprising:
 a bus interface controller to manage a set of serial data lanes; and
 said bus interface controller having a first mode of operation in which said set of serial data lanes is managed as a full bus and a second mode of operation in which a first subset of said serial data lanes is managed as a first bus and a second subset of said serial data lanes is managed as a second bus;
 the first bus coupling a first graphics processing unit (GPU) to a second GPU via a first data pathway including an intervening chipset with the second bus serving as a private bus providing a second data pathway that is a direct data pathway between the first and second GPUs:
 a logical channel module to logically partition said set of serial data lanes in said second mode of operation into two channels corresponding to a first channel for the first bus and a second channel for the second bus, the first channel of the first bus configured to form a Peripheral Component Interface Express (PCI-E) bus with the chipset;
 wherein the bus interface controller in the second mode accounts for difference in data latency for data traffic from the second GPU received via the second PCI-E bus and the private bus by reordering data requiring a semantic order.

6. The apparatus of claim 5, wherein the bus interface controller includes a reorder module to reorder data received via said private bus in said second mode of operation into a semantic order, said reorder module accounting for differences in data latency between a plurality of different data pathways in said second mode of operation associated with utilizing both said second PCI-E bus and said private bus for communication between said first and second GPUs.

7. The apparatus of claim 5, wherein said private bus is a bus between two card connectors of a motherboard.

8. The apparatus of claim 5, wherein there are sixteen serial data lanes, said first mode corresponding to a PCI-E bus having sixteen serial data lanes and said second mode corresponds to a PCI-E bus having eight serial data lanes and a private bus having eight serial data lanes.

9. A system to provide card-to-card communication in a computing system, comprising:
 a first bus interface controller disposed in a first graphics processing unit (GPU), the first bus interface controller managing a first set of serial data lanes;
 a second bus interface controller disposed in a second GPU, the second bus interface controller managing a second set of serial data lanes;
 said first GPU of said system having a default mode of operation for solo operation in which the first set of serial data lanes is operated as a first Peripheral Component Interface Express (PCI-E) bus to a chipset; and
 said second GPU in the default mode of operation for solo operation having said second set of serial data lanes operated as a second PCI-E bus to said chipset;
 said system configurable to operate in a private bus mode of operation in which the first set of serial data lanes and the second set of serial data lanes are logically partitioned to allocate a selected subset of serial data lanes from the first set of serial data lanes and the second set of serial data lanes to act as a private bus between said first GPU and said second GPU, wherein said first PCI-E bus and said second PCI-E bus operate with a reduced number of serial data lanes compared with said default mode;
 the system in the private bus mode of operation accounting for differences in data latency for GPU-to-GPU traffic flowing in a direct path along said private bus between said first GPU and said second GPU and GPU-to-GPU traffic flowing in an indirect path via said chipset;
 wherein said bus interface controller accounts for differences in data latency by performing data reordering for data requiring a semantic order.

10. The system of claim 9, wherein each bus interface controller includes a reorder module to perform data reordering for data requiring a semantic order.

11. A method of operating a set of graphics processing units (GPUs), comprising:
 in response to a GPU being used in a default mode corresponding to solo operation, operating a set of serial data lanes as a first Peripheral Component Interface Express (PCI-E) bus to a chipset; and
 in response to configuring the GPU for use in a system having at least two GPUs, logically partitioning the set of serial data lanes so that a first subset of serial data lanes is used as a reduced bandwidth PCI-E bus to the chipset and a second subset of serial data lanes is used as a private bus to another GPU;
 for the system having at least two GPUs, performing data reordering for data requiring a semantic order to account for differences in latency between GPU-to-GPU traffic flowing in a direct path through said private bus and GPU-to-GPU traffic flowing in an indirect path via the reduced bandwidth PCI-E bus to the chipset.

12. The method of claim 11, wherein the first subset of serial data lanes is assigned to a first channel and the second subset of serial data lanes is assigned to a second channel.

* * * * *